(12) United States Patent
Covo

(10) Patent No.: US 12,044,261 B2
(45) Date of Patent: Jul. 23, 2024

(54) HOOK AND PIN ATTACHMENT SYSTEM FOR ATTACHING TWO COMPONENTS

(71) Applicant: VOLVO TRUCK CORPORATION, Gothenburg (SE)

(72) Inventor: Yohan Covo, Greensboro, NC (US)

(73) Assignee: VOLVO TRUCK CORPORATION, Gothenburg (SE)

( * ) Notice: Subject to any disclaimer, the term of this patent is extended or adjusted under 35 U.S.C. 154(b) by 619 days.

(21) Appl. No.: 17/106,670

(22) Filed: Nov. 30, 2020

(65) Prior Publication Data

US 2022/0170497 A1  Jun. 2, 2022

(51) Int. Cl.
*F16B 21/02* (2006.01)

(52) U.S. Cl.
CPC .......... *F16B 21/02* (2013.01); *Y10T 403/7005* (2015.01)

(58) Field of Classification Search
CPC ...... F16B 5/0036; F16B 5/0044; F16B 5/008; F16B 5/0084; F16B 5/0088; F16B 21/02; F16B 21/04; F16B 21/07; F16B 21/073; F16B 21/09; Y10T 403/59; Y10T 403/591; Y10T 403/7005; Y10T 403/7009; Y10T 403/7011; Y10T 403/7015
See application file for complete search history.

(56) References Cited

U.S. PATENT DOCUMENTS

| | | | | |
|---|---|---|---|---|
| 2,876,485 A * | 3/1959 | Cowles | ................ | F16B 21/073 D8/382 |
| 4,426,181 A * | 1/1984 | Omata | ................ | F16B 19/1081 411/33 |
| 4,599,768 A * | 7/1986 | Doyle | ................ | F16B 21/02 24/456 |
| 4,936,066 A * | 6/1990 | Rutsche | ................ | F16B 5/10 52/DIG. 1 |
| 5,142,834 A * | 9/1992 | Laclave | ................ | F16B 5/10 24/453 |
| 5,368,427 A * | 11/1994 | Pfaffinger | ............... | F16B 21/04 24/DIG. 54 |
| 5,626,435 A * | 5/1997 | Wohlhuter | .............. | F16B 21/02 403/348 |
| 6,364,262 B1 * | 4/2002 | Gibson | ................ | A47F 5/0068 248/229.24 |
| 6,772,982 B2 | 8/2004 | Nakagawa et al. | | |
| 2015/0192160 A1 * | 7/2015 | Gong | ................ | F16B 5/065 411/360 |

FOREIGN PATENT DOCUMENTS

WO  WO-2015169888 A1 * 11/2015 ................ F16B 5/10

* cited by examiner

*Primary Examiner* — Josh Skroupa
*Assistant Examiner* — Kevin J Baynes
(74) *Attorney, Agent, or Firm* — WRB-IP PLLC

(57) ABSTRACT

An attachment system is provided for attaching a first component to a second component and includes a hook member attachable to the first component, and a pin member attachable to the second component, the pin member including a first member and a second member attached to and extending perpendicular to the first member. The second member is received through a gap in the hook member and in an opening of the first member to place the pin member in a mounting orientation relative to the gap the pin member is pivoted to a securing orientation relative to the opening in Which position the second member is blocked from being removed from the opening by portions of the hook member.

18 Claims, 7 Drawing Sheets

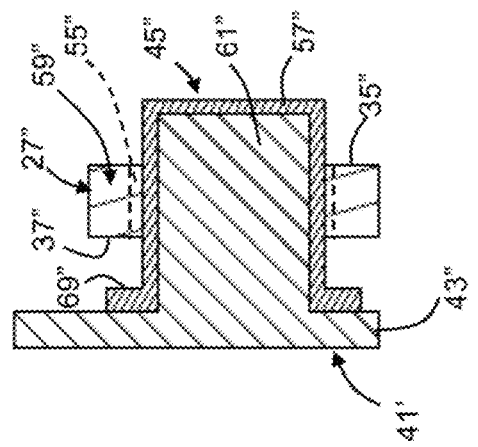
FIG. 4A
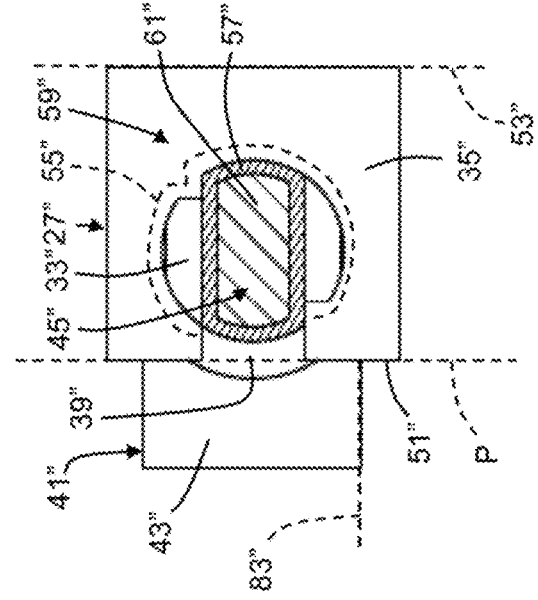
FIG. 4B
FIG. 4C
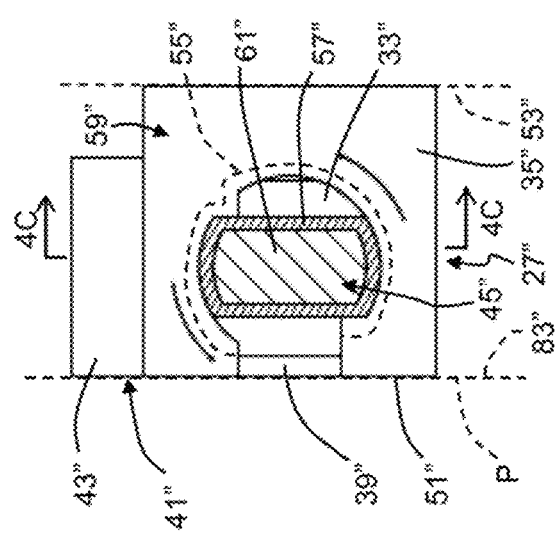
FIG. 4D
FIG. 4E

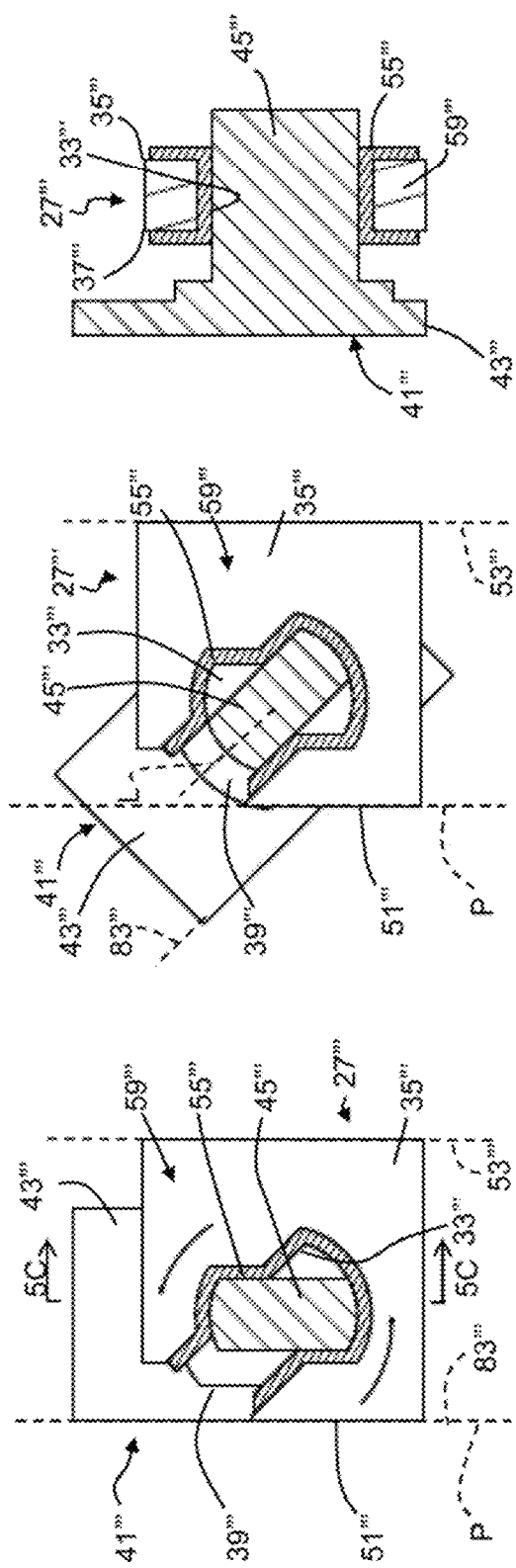
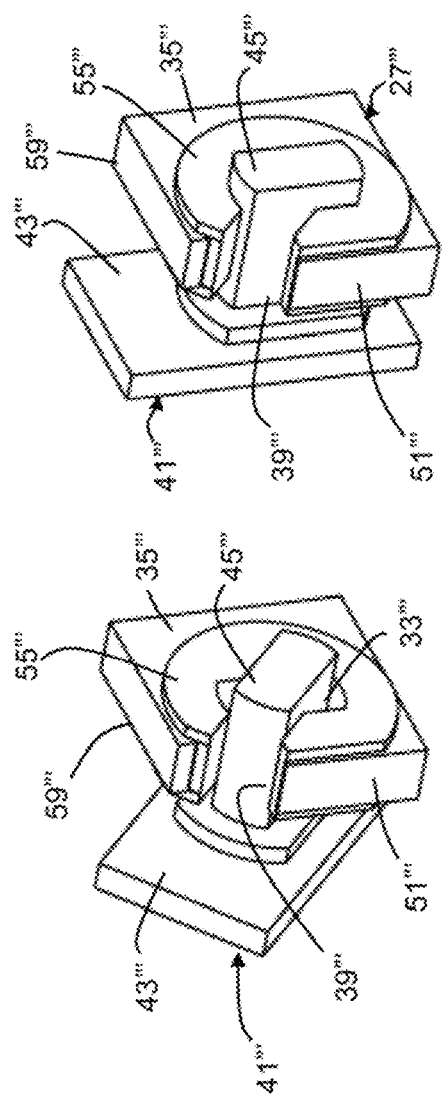

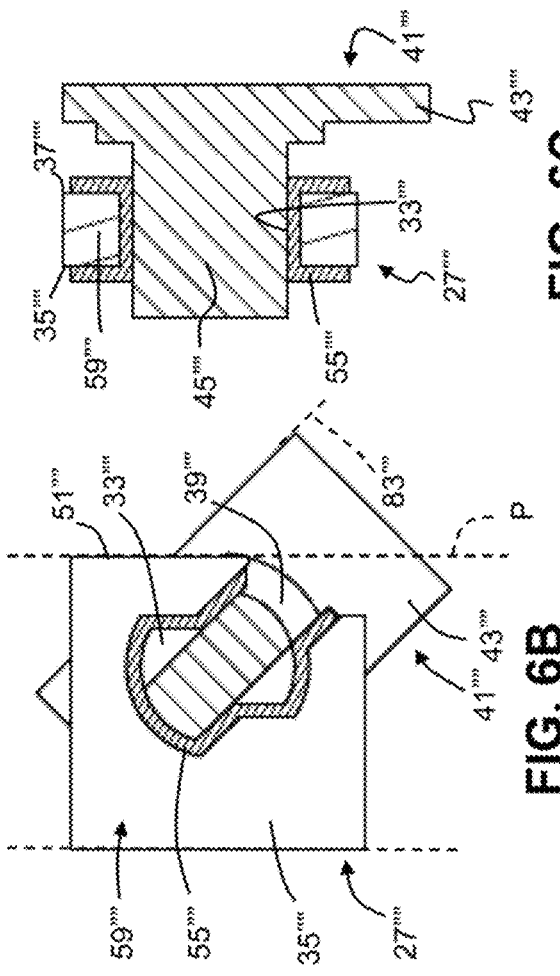
FIG. 6A
FIG. 6B
FIG. 6C
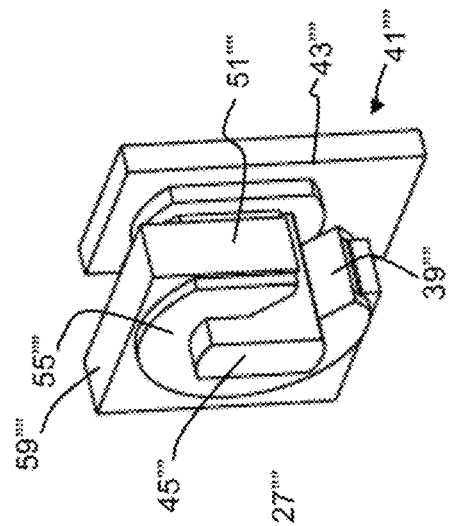
FIG. 6D
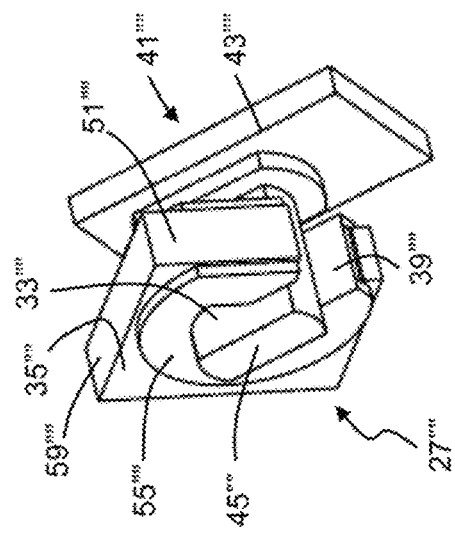
FIG. 6E

HOOK AND PIN ATTACHMENT SYSTEM FOR ATTACHING TWO COMPONENTS

BACKGROUND AND SUMMARY

The present invention relates generally to attachment system for attaching a first component to a second component and, more particularly, to an attachment system wherein the first component and the second component are attached to each other via a hook and pin arrangement.

Ordinarily, when attaching two components to each other, such as when attaching an electric fan to a charge air cooler in a vehicle, one or more fasteners, such as screws or bolts, are provided on each corner of one or both of the component. Installation can be complicated as the components and their screw or bolt holes must be aligned and the components held in place relative to each other before a screw or bolt can be inserted in a hole so that the components are at least somewhat held in place relative to each other by a fastener. This can be particularly difficult if the components are relatively large or in hard-to-access locations and sometimes requires special tools and/or more than one person to accomplish the attachment.

Additionally, components that are intended to be attached to each other can be difficult to attach due to variances in tolerances in components. After attachment, they may be subject to vibration, geometrical variation, and/or thermal expansion.

It is desirable to provide an attachment system that can facilitate attaching two components to each other in a simple manner without requiring a device such as a listener to hold the components in place during the attachment operation. It is further desirable to provide an attachment system that is convenient ergonomically. It is further desirable to provide an attachment system that facilitates attachment of two components without the need for special tools. It is further desirable to provide an attachment system that can be included as integral parts of the components to be attached. It is further desirable to provide an attachment system that is inexpensive to provide. It is further desirable to provide an attachment system that can lock two components relative to each other in three directions (e.g., up-down, forward-back, left-right). It is further desirable to provide an attachment system that can minimize vibration between components. It is further desirable to provide an attachment system that can accommodate thermal expansion of components. It is further desirable to provide an attachment system that can accommodate tolerance variations in components to be attached.

According to an aspect of the present invention, an attachment system for attaching a first component to a second component comprises a hook member attached to or attachable to the first component, the hook member comprising an upper member and a lower member partially defining an opening extending through the hook member from a first side to an opposite second side of the hook member and a gap between the lower member and the upper member, the gap extending through the hook member from the first side to the second side of the hook member and leading to the opening, and a pin member attached to or attachable to the second component, the pin member including a first member and a second member attached to and extending in a direction of a center axis of the opening, the second member being generally rectangular in shape when viewed in cross-section in a direction of a longitudinal centerline of the second member and having a long side and a short side, the second member being receivable through the gap and in the opening when the pin member is in a mounting orientation relative to the hook member and, upon pivoting the pin member to a securing orientation relative to the opening while the second member is received in the opening, the second member being blocked from being removed from the opening by the upper member and the lower member.

According to another aspect of the invention, a pair of attached components is provided and comprises the first component and the second component attached to each other via the attachment system described above.

BRIEF DESCRIPTION OF THE DRAWINGS

The features and advantages of the present invention are well understood by reading the following detailed description in conjunction with the drawings in which like numerals indicate similar elements and in which:

FIG. 4A is a side, partially cross-sectional view of an attachment system according: to an aspect of the present invention showing the attachment system in a securing position, FIG. 4B is a side, partially cross-sectional view of the attachment system of FIG. 4A showing the attachment system in a mounting position, FIG. 4C is a side, cross-sectional view of the attachment system taken at section 4C-4C of FIG. 4A, FIG. 4D is a perspective view of the attachment system of FIG. 4A in a mounting position, and FIG. 4B is a perspective view of the attachment system of FIG. 4A in a securing position.

FIG. 5A is a side, partially cross-sectional view of an attachment system according to an aspect of the present invention showing the attachment system in a securing position, FIG. 5B is a side, partially cross-sectional view of the attachment system of FIG. 5A showing the attachment system in a mounting position, FIG. 5C is a side, cross-sectional view of the attachment system taken at section 5C-5C of FIG. 5A, FIG. 5D is a perspective view of the attachment system of FIG. 5A in a mounting position, and FIG. 5E is a perspective view of the attachment system of FIG. 5A in a securing position;

FIG. 6A is a side, partially cross-sectional view of an attachment system according to an aspect of the present invention showing the attachment system in a securing position, FIG. 6B is a side, partially cross-sectional view of the attachment system of FIG. 6A Showing the attachment system in a mounting position, FIG. 6C is a side, cross-sectional view of the attachment system taken at section 6C-6C of FIG. 6A, FIG. 6D is a perspective view of the attachment system of FIG. 6A in a mounting position, and FIG. 6E is a perspective view of the attachment system of FIG. 6A in a securing position.

DETAILED DESCRIPTION

Figure 1B:
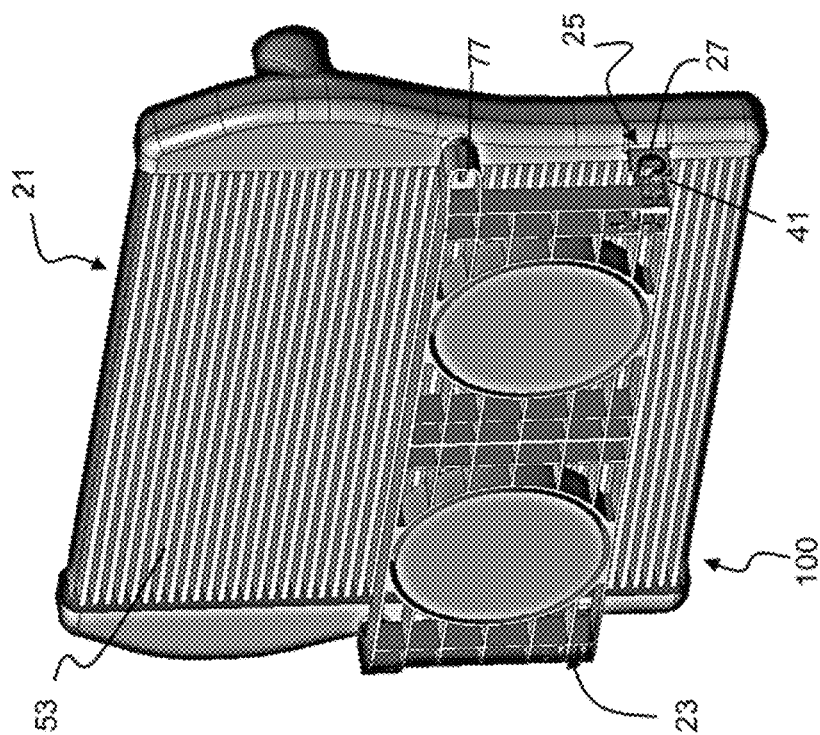
FIGS. 1A and 1B are perspective views showing a pair of components according to an aspect of the present invention being attached to each other and moving from a mounting position to a securing position.
Figure 1A:
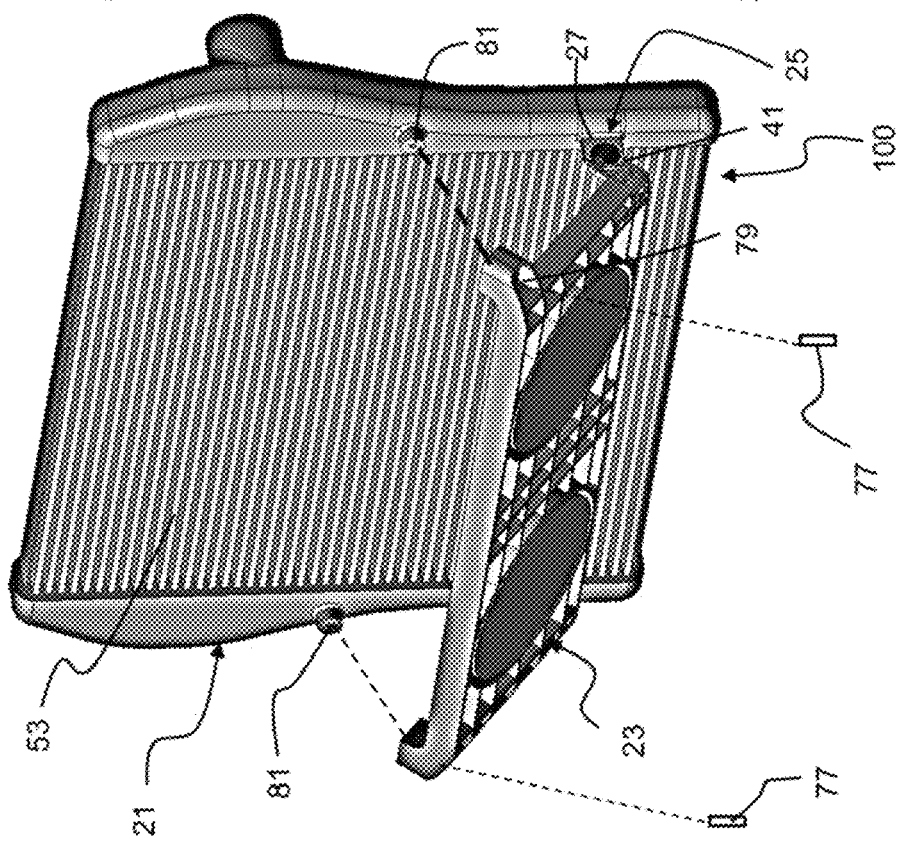

FIGS. 1A and 1B show a pair 100 of components including a first component 21 and second component 23 that are attached together via an attachment system 25 according to an aspect of the present invention. FIGS. 1A-1B show an attachment system 25 used for mounting a second component 23 comprising electric fans on a first component 21 comprising a charge air cooler for a vehicle, however, it will be appreciated that the attachment system is useful in a variety of applications and industries. Illustrative embodiments of the attachment system are shown in more detail in, e.g., FIGS. 3A-3E, 4A-4E, 5A-5E, and 6A-6E.

Figure 2A:
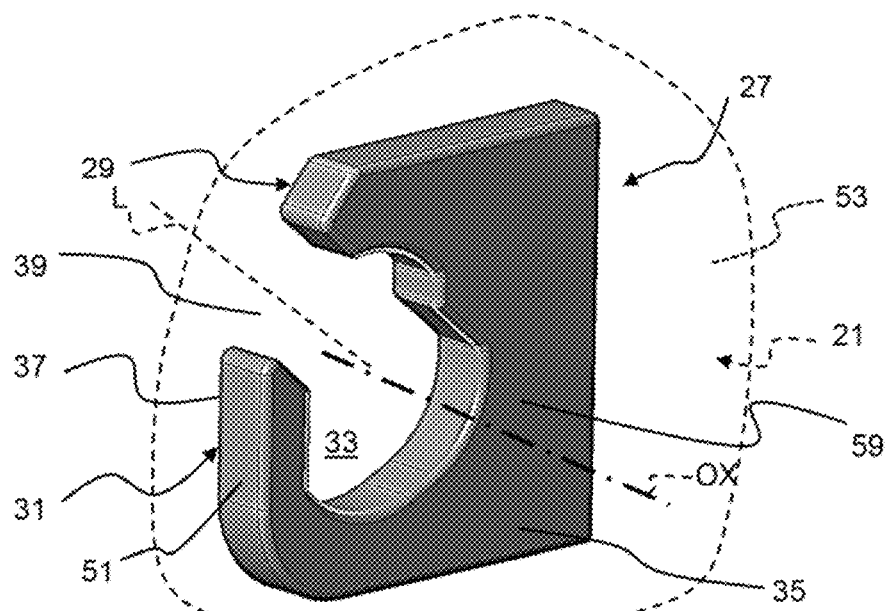
FIG. 2A is a perspective view of a hook member of attachment, system according to an aspect of the present invention.
Figure 2B:
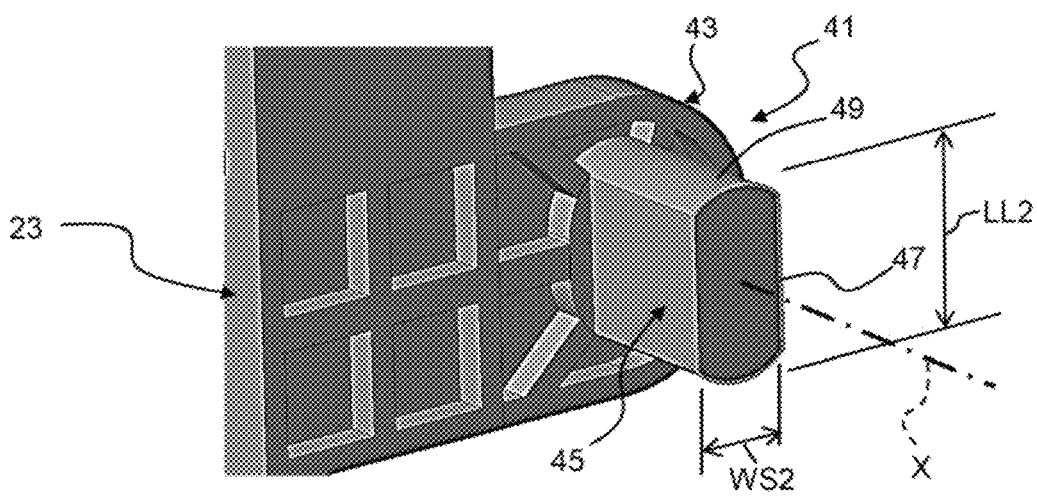
FIG. 2B is a perspective view of a pin member of an attachment system according to an aspect of the present invention.
Figure 2C:
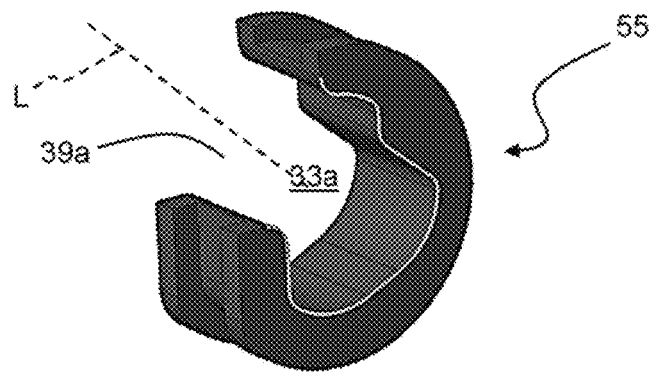
FIG. 2C is a perspective view of an intermediate bushing of an attachment system according to an aspect of the present invention.

With reference to FIGS. 2A-2C for purposes of discussion, the attachment system comprises a hook member 27 (FIG. 2A) attachable to the first component 21 (shown in phantom in FIG. 2A). As seen in FIG. 2A, the hook member 27 comprises an upper member 29 and a lower member 31 partially defining an opening 33 extending through the hook member from a first side 35 to an opposite second side 37 of the hook member. The upper member 29 and the lower member 31 also define a gap 39 between the lower member and the upper member, the gap extending through the hook member 27 from the first side 35 to the second side 37 of the hook member and leading to the opening 33.

The opening 33 may be defined by a single-piece hook member 27 (as seen, for example, in FIGS. 7A-7C) or, as shown in FIGS. 3A-3C, 5A-5C, and 6A-6C partially or entirely b an intermediate bushing 55', 55''', 55'''', respectively, attached to as main body portion 59', 59''', 59'''' of hook member and 27', 27''', 27'''' and thereby forming the opening 33', 33''', 33'''' of the hook member. FIG. 2C shows an embodiment of an intermediate bushing 55 intended to be attached to a main body portion 59 (FIG. 2A) of the hook member 27 and to thereby define at least part of the opening 33. An intermediate bushing 55 as shown in FIG. 2C may entirely or partially define the dimensions of the opening 33a of the hook member and may also entirely or partially define the dimensions of the gap 39a of the hook member.

The attachment system 25 further comprises a pin member 41 seen in FIG. 2B that is attached to or attachable to the second component 23. The pin member 41 includes a first member 43 and a second member 45 attached to and extending in a direction of a center axis OX (FIG. 2A) of the opening. The second member 45 is generally roughly rectangular in shape when viewed in cross-section in a direction of a longitudinal centerline X (FIGS. 2B and 3B) of the second member and has a long side 47 and a short side 49. The second member is described as being roughly rectangular in the sense that, as shown, it is ordinarily not precisely rectangular as the short sides 49 of the second member are ordinarily curved between two parallel chords of a circle that form the long sides of the second member, the curve of the short side ordinarily having substantially the same radius as a curved portion of the opening 33.

The hook member 27 and pin member 41 shown in FIGS. 2A and 2B can be and ordinarily are the same as the hook members and pin members shown in FIGS. 3A-3E, 4A-4E, 5A-5E, and 6A-6E, except as otherwise indicated herein. As seen with reference to the embodiment of the attachment system 25' shown in FIGS. 3A-3E for purposes of discussion, the second member 45' can be oriented relative to the first member 43' such that it is receivable through the gap 39' and in the opening 33' when the pin member 41' is in a mounting orientation (e.g., FIGS. 3B and 3D) relative to the gap. Upon pivoting the pin member 41' to a securing orientation relative to the opening 33' while the second member 45' is received in the opening (e.g., FIGS. 3A and 3E), the second member is blocked from being removed from the opening by the upper member 29' and the lower member 31'.

The geometry of the opening, whether formed by an intermediate bushing on a main body portion of a hook member, or by a hook member with no intermediate bushing, generally comprises two arcs having radii substantially equal to radii of the curved short sides of the second member and two flat surfaces extending from an end of each arc. As seen, for example, in FIG. 3B, a width WS2 of the short side 49' of the second member 45' is less than or equal to a width WG of the gap 39' so that the second member can be fit into the gap. A length 112 of the long side 47' of the second member 45' is less than or equal to a smallest diameter DO of the opening 33' so that the entire length of the long side of the second member can be received in the opening and so that, once entirely received in the opening in the mounting orientation as shown in, e.g., FIG. 3B, can be rotated to the securing orientation with the curved short sides of the second member moving along the arcs of the opening as shown in, e.g., FIG. 3A in which ends of the long sides of the second member abut the flat surfaces and are prevented from rotating past the flat surfaces. In this way, abutting flat surfaces of the opening and the second member resist relative displacement of the first and second members in directions perpendicular to the flat surfaces, and abutting curved surfaces of the opening and the second member resist relative displacement of the first and second member in directions parallel to the flat surfaces. Movement of the components relative to each other in the direction of the length of the second member can be restrained by contact between the surfaces of the hook member and the first member of the pin member (surfaces 37 and 83 in FIG. 7C, respectively) or, if provided, a flange (flange 69 in FIG. 7C and/or a portion of an intermediate bushing (e.g., FIGS. 3C, 4C, 5C, 6C).

The hook members 27, 27', 27'', 27''', 27'''' shown in FIGS. 2A, 3A-3E, 4A-4E, 5A-5E, and 6A-6E, respectively, have front faces 51, 51', 51'', 51''', and 51'''', respectively. In the illustrated embodiments, the front faces 51, 51', 51'', 51''', and 51'''', are substantially flat and lie in a plane P (FIGS. 3A-3B; 4A-4B, and 6A-6B). The plane P is usually but not necessarily parallel to as surface 53 (FIGS. 1A and 1B) 53', 53'', 53''', and 53'''' or a plane of the surface of the first component 21 from which the hook member protrudes. It will be appreciated that it is not necessary for the front faces of the hook members to be flat—they may, for example, be circular or irregular though portions may lie on a plane P.

In the embodiments shown in FIGS. 3A-3E (and 4A-4E), a line L (FIG. 3B) along a center axis of the gap 39' (39'' in FIGS. 4A-4E) to a center of the opening 33' of the hook member 27' is substantially perpendicular to the plane P. In the embodiments shown in FIGS. 5A-5E (and 6A-6E), a line L (FIG. 5B) along a center axis of the gap 39''' (39'''' in FIGS. 6A-6E) to a center of the opening 33''' (33'''') of the hook member 27''' (27'''') defines an approximately a 45 degree angle with the plane P. It will be appreciated that a line along a center axis of the gap to the center of the opening of a given hook member may form any desired angle with the plane of the front face of the particular hook member.

The intermediate bushing, if provided, may wholly or partially define one or both of the opening of the hook member and the second member of the pin member. The intermediate bushing can be useful to, among other things, hold the hook member and the pin member in the securing orientation relative to each other, and to reduce vibration of the hook member and the pin member and of the first component and the second component, particularly when made from a material that is more resilient than the hook member and/or the pin member.

FIGS. 3A-3C, 5A-5C, and 6A-6C show an intermediate bushing 55', 55''', and 51'''', respectively, attached to the main body portion 59', 59''', 59'''' thereby forming the opening 33', 33''', 33'''' of the hook member 27', 27''', and 27'''', respectively. The intermediate bushing can extend outwardly relative to at least one of the first and second side 35', 35''', 35'''' and 37', 37''', 37'''', normally both, of the book member 27', 27''', 27''''.

FIGS. 4A-4C show an embodiment of the intermediate bushing 57" attached on a main body portion 61" of the second member 45" of the pin member 41" and that forms part or all of an exterior surface of the second member. Where the intermediate bushing 57" is provided on the main body portion 61" of the second member 45' as seen in FIGS. 4A-4C, the intermediate bushing may also extend outwardly relative to at least one of the first and second side 35" and 37" of the hook member 27". FIGS. 4A-4C also show, in phantom, an additional intermediate bushing 55" forming at least part of the opening 33" of the book member 27". In all of the embodiments, an intermediate bushing can be provided as part of the opening of the hook member, as an exterior surface of the second member of the pin member, or both. An intermediate bushing may also be omitted entirely.

Figure 3C:
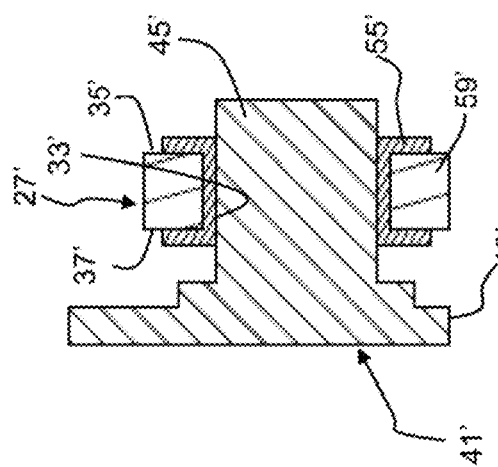
FIG. 3C is a side, cross-sectional view of the attachment system taken at section 3C-3C of FIG. 3A.
Figure 3B:
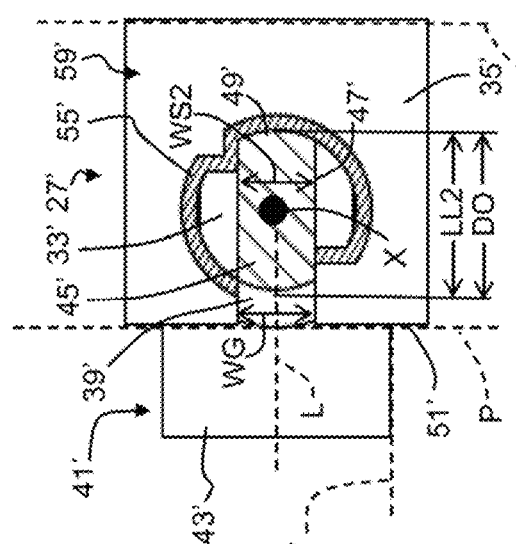
FIG. 3B is a side, partially cross-sectional view of the attachment system of FIG. 3A showing the attachment system in a mounting position.
Figure 3A:
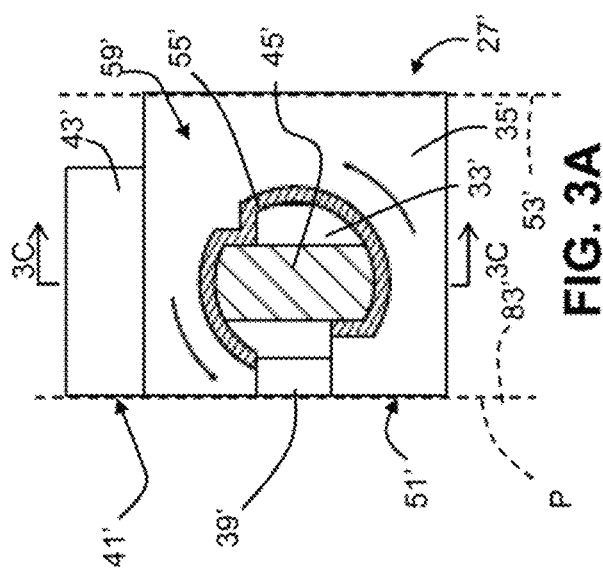
FIG. 3A is a side, partially cross-sectional view of an attachment system according to an aspect of the present invention showing the attachment system in a securing position.
Figure 3E:
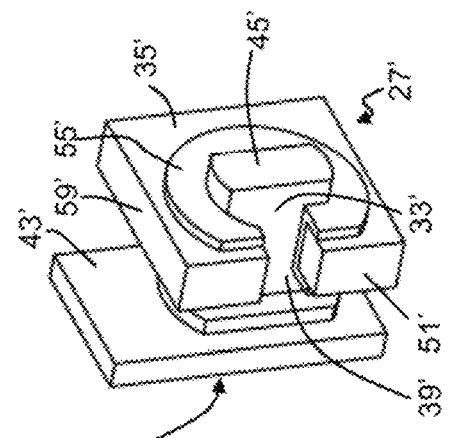
FIG. 3E is a perspective view of the attachment system of FIG. 3A in a seeming position.
Figure 3D:
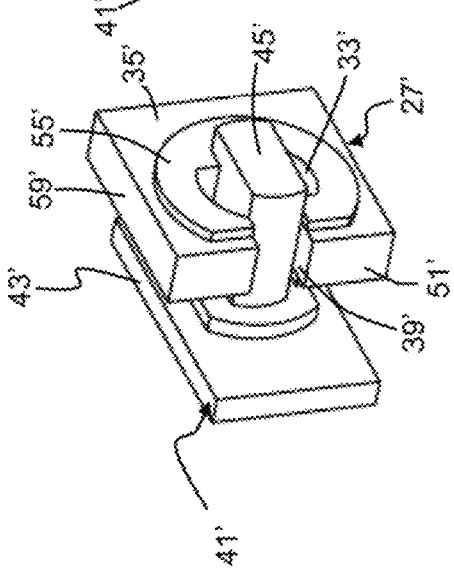
FIG. 3D is a perspective view of the attachment system of FIG. 3A in a mounting position.

With reference to FIGS. 3A-3C, the intermediate bushing 55' will ordinarily, but not necessarily, be made of a material that is more resilient than a main body portion 59' of the hook member in which the intermediate bushing is disposed and, with reference to FIGS. 4A-4C, the intermediate bushing 57" will ordinarily, but not necessarily, be more resilient than the main body portion 61" of the second member 41' around which it is disposed. For example, the intermediate bushing 55' of, e.g., FIGS. 3A-3C may be a molded rubber component that is fitted over part or all of a corresponding part of the main body portion 59' of the hook member, and the intermediate bushing 57" of, e.g., FIGS. 4A-4C may be a molded rubber component that is fitted over part or all of a corresponding main body portion 61" of the second member 45" where the main body portion 59' and/or 61" might be a hard plastic or metal.

The intermediate bushing, whether provided on the main body portion of the hook member or the main body portion of the second member may be compressed when the second member is moved to the securing orientation. For example, the gap defined by the intermediate bushing on the main body portion or the hook member may be slightly smaller than a length of the short side of the pin member so that it is necessary to compress the intermediate bushing to fit the pin through the gap and for the largest diameter or dimension of the opening defined by the intermediate bushing on the main body portion of the hook member may be slightly smaller than a length of the long side of the pin member so that it is necessary to compress the intermediate bushing to fully receive the pin in the opening and to turn the pin to the securing position. Similarly, the length of the short side of the pin member formed by the intermediate bushing and the main body portion of the second member may be slightly larger than the gap on the hook member so that it is necessary to compress the intermediate bushing to fit the pin through the gap and/or the length of the long side of the pin member formed by the intermediate bushing and the main body portion of the second member may be slightly larger than the largest diameter or dimension of the opening in the hook member so that it is necessary to compress the intermediate bushing to fully receive the pin in the opening and to turn the pin to the securing position. Compressing the intermediate bushing, whether provided on the main body portion of the hook member r the main body portion of the second member when the second member is moved to the securing orientation can facilitate avoiding unintentional detachment of the first component and the second component, as well as facilitate avoidance or minimization of vibration of the first component and the second component relative to each other. It will be understood that references to the width (e.g., WG in FIG. 3B) of the gap of the hook member being equal to or greater than the width (e.g., WS2 in FIG. 3B) of the pin member and the diameter (e.g., DO in FIG. 3B) of the opening in the hook member being equal to or greater than the length (e.g., LL2 in FIG. 3B) of the pin member is intended to encompass circumstances where the width of the gap of the hook member is smaller than the width of the pin member and the diameter of the opening in the hook member is smaller than the length of the pin member but where they are caused to be equal upon compression of, e.g., an intermediate bushing during attachment of the pin member and the hook member and movement to a securing position.

Figure 7C:
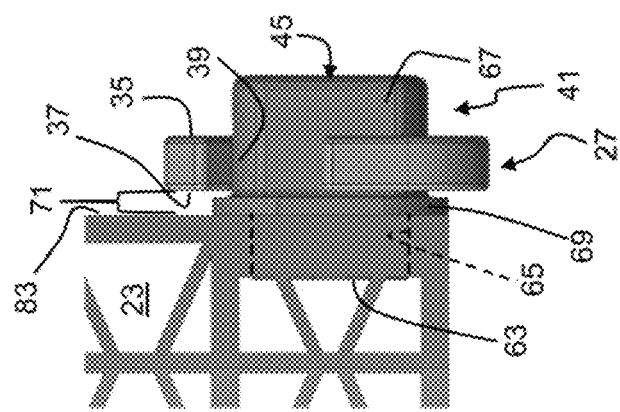
FIG. 7C is a side view of the attachment system of FIG. 7B rotated 90° from the view of FIG. 7B.

As seen in FIGS. 7C, the second member 45 can comprise a first portion 63 disposed in an opening 65 (shown in phantom) in the first member 43, a second portion 67 disposed outside of the opening, and a flange 69 at a base of the second portion, the flange being larger than the opening. Via such a structure, the second member 45 can be attachable to and detachable from the first member, which can facilitate manufacture and reduce cost of the second component. The flange 69 can function as a stop to indicate how far into the opening 65 in the first member 43 the first portion 63 of the second member 45 can be permitted to be inserted. As seen, for example, in FIGS. 3C-3E, 5C-5E, and 6C-6E, the second member 45', 45''', 45'''' may, alternatively, be integrally formed with the first member 43', 43''', 43'''', or, in the case of FIGS. 4C-4E, the main body portion 61" of the second member 45" may be formed integrally with the first member 43". In the embodiment of FIGS. 4C-4E, a flange 69" is provided on an end of the intermediate bushing 57" on the main body portion 61" of the second member 45".

While it is presently anticipated that it will ordinarily be desirable for the hook member to be an integrally attached part of the first component and for the pin member to be an integrally attached part of the second component, it will be appreciated that the hook member may be attachable to and detachable from the first component and that the pin member may be attachable to and detachable from the second component, such as by being secured via fasteners.

Referring to FIG. 7C for purposes of discussion, a gap 71 can be provided between the hook member 27 and the first member 43. The flange 69 is smaller (in thickness than a width of the gap 71. As seen, for example, in FIG. 7C, a surface 83 of the first member 43 of the pin member 41 that faces the hook member 27 can be typically is substantially parallel with a surface 37 of the hook member facing the first member. Provision of the gap 71 can facilitate absorbing manufacturing tolerances of the first and second components 21 and 23 and of the hook member 27 and the pin member 41. In addition, provision of the gap can facilitate permitting expansion and contraction of the first and second components 21 and 23 and of the hook member 27 and the pin member 41 that may occur due to variation in temperature of the components, thus limiting thermal stresses on the components.

In the pair 100 of attached components comprising the first component 21 and the second component 23 attached to each other via the attachment system 25, one or more fasteners 77 for fastening the first component and the second component relative to each other can be provided to facilitate retaining the second member the securing orientation (FIG. 1B) relative to the gap. The first component 21 and the second component 23 may be provided with pre-formed holes for receiving the fastener 77, such as a through hole 79 in the second component through which the fastener can extend and a threaded or threadable hole 81 in the first component into which threads of the fastener can be screwed.

Figure 7B:
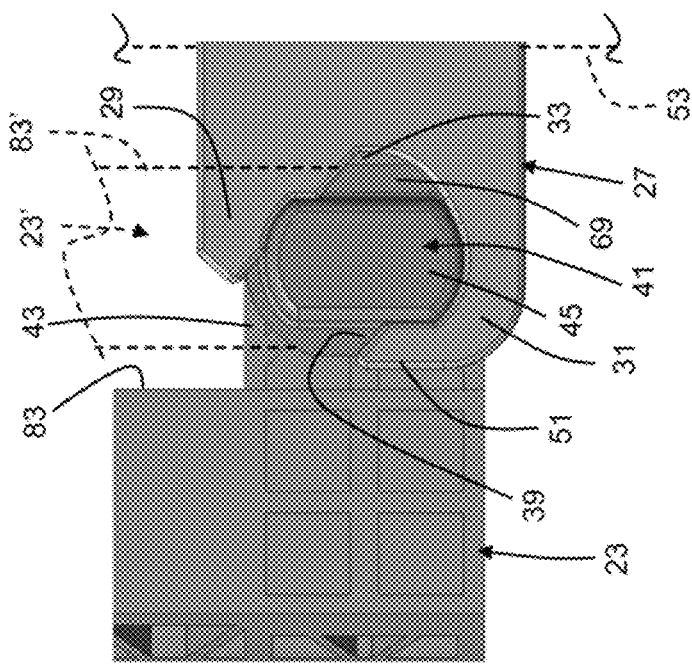
FIGS. 7A-7B are side views of an attachment system according to an aspect of the present invention showing the attachment system in a mounting position and a securing position, respectively.
Figure 7A:
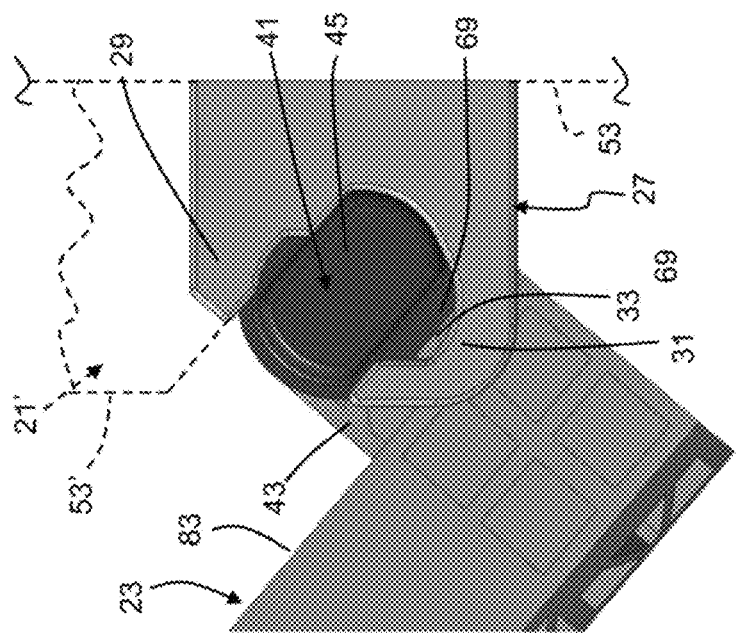

In the illustrated embodiments, such as the embodiment of FIGS. 7A-7B, the hook member 27 and the pin member 41 project outwardly from a surface 53 of the first component 21 and a surface 83 of the second component 23, respectively. In FIGS. 3A-3B, 4A-4B, 5A-5B and 6A-6B the hook member 27', 27'', 27''', 27'''' and the pin member 41', 41'', 41''', 41'''' project outwardly from surfaces 53', 53'', 53''', 53'''' (shown m phantom) of the first component and surfaces 83', 83'', 83''', 83'''' shown in phantom) of the second component, respective. As shown in phantom in FIG. 7A, however, the gap 39 and opening 33 of the hook member 47 may be recessed inside of the surface 53' of the first component 21' that faces the second component 23. As shown in phantom in FIG. 7B, the second member 43 may be disposed inward of a surface 83' of the second component 23' in which case the first member 45' comprises part of a side oldie second component. Both the hook member and the pin member may be recessed relative to surfaces of the first component and the second component, respectively, such as where the pin member is disposed on legs of part of a second component and the first component is received between the legs of the second component.

The attachment system according to all aspects of the present invention can facilitate attaching two components to each other in a simple manner by simply sliding the second member of the pin member into the gap and opening of the hook member and rotating the first and second components relative to each other from the mounting position to the securing position. This mounting operation does not require a device such as a fastener to hold the components in place during the attachment operation.

The attachment system is convenient ergonomically as the second component may be moved from the mounting position to the securing position in small, difficult to access spaces.

The attachment system facilitates attachment of two components without the need for special tools as, for many components, the attachment system alone may be all that is required to attach two components to each other and, in many other instances, simple fasteners such as screws or bolts can more securely hold the components in place relative to each other.

The attachment system can be included as an integral part of the components to be attached and can be very inexpensive to provide.

The attachment system can lock two components relative to each other in three directions (e.g., up-down, forward-back, left-right).

The attachment system can minimize vibration between components, particularly when provided with an intermediate bushing made off material that is more resilient than the main body portion of the hook member and/or the pin member. The attachment system can accommodate thermal expansion of components, particularly when provided with an intermediate bushing made of a material that is more resilient than the main body portion of the hook member and/or the pin member, and also or alternatively by provision of a gap between facing surfaces of the hook member and the pin member. The attachment system can accommodate tolerance variations in components to be attached, particularly when provided with an intermediate bushing made of a material that is more resilient than the main body portion of the hook member and/or the pin member, and also or alternatively by provision of a gap between facing surfaces of the hook member and the pin member.

In the present, application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. An attachment system for attaching a first component to a second component, comprising:
   a hook member attachable to the first component, the hook member comprising an upper member and a lower member partially defining an opening extending through the hook member from a first side to an opposite second side of the hook member and a gap between the lower member and the upper member, the gap extending through the hook member from the first side to the second side of the hook member, and from a front face of the hook member and leading to the opening; and
   a pin member attachable to the second component, the pin member including a first member and a second member attached to and extending in a direction of a center axis of the opening, the second member being generally rectangular in shape when viewed in cross-section in a direction of a longitudinal centerline of the second member and having a long side and a short side, the second member being receivable through the gap and in the opening when the pin member is in a mounting orientation relative to the hook member and, upon pivoting the pin member to a securing orientation relative to the opening while the second member is received in the opening, the second member being blocked from being removed from the opening by the upper member and the lower member,
wherein the gap extends from the opening through the front face at a non-perpendicular angle to the front face.

2. The attachment system as set forth in claim 1, wherein a width of the short side of the second member is less than or equal to a width of the gap.

3. The attachment system as set forth in claim 1, wherein a length of the long side of the second member is less than or equal to a smallest diameter of the opening.

4. The attachment system as set forth in claim 1, wherein the line along the center axis of the gap to the center of the opening defines a 45 degree angle with the front face of the hook member.

5. The attachment system as set forth in claim 1, further comprising an intermediate bushing on at least one of the opening and the second member.

6. The attachment system as set forth in claim 5, wherein the hook member comprises a main body portion and the intermediate bushing attached to the main body portion and defining at least part of the opening.

7. The attachment system as set forth in claim 6, wherein the intermediate bushing is made of a material that is more resilient than the main body portion.

8. The attachment system as set forth in claim 5, wherein the intermediate bushing extends outwardly relative to at least one of the first and second side of the hook member.

9. The attachment system as set forth in claim 5, wherein the intermediate bushing is compressed when the second member is moved to the securing orientation.

10. The attachment system as set forth in claim 9, wherein a length of the long side of the second member is greater than a largest diameter of the opening when the intermediate bushing is not compressed.

11. The attachment system as set forth in claim 5, wherein the intermediate bushing is attached to and surrounds at least part of the second member.

12. The attachment system as set forth in claim 1, wherein the second member comprises a first portion disposed in an opening in the first member, a second portion disposed outside of the opening, and a flange at a base of the second portion, the flange being larger than the opening.

13. The attachment system as set forth in claim 12, comprising a gap between the hook member and the first member, the flange being smaller than the gap.

14. The attachment system as set forth in claim 1, wherein a surface of the first member facing the hook member is substantially parallel with a surface of the hook member facing the first member.

15. A pair of attached components, comprising the first component and the second component attached to each other via the attachment system of claim 1.

16. The pair of attached components as set forth in claim 15, comprising one or more fasteners for fastening the first component and the second component relative to each other so that the second member is retained in the securing orientation relative to the gap.

17. The pair of attached components as set forth in claim 15, wherein at least one of the hook member and the pin member project outwardly from a surface of the first component and the second component, respectively.

18. The pair of attached components as set forth in claim 15, wherein at least one of the hook member and the pin member is recessed relative to a surface of the first component and the second component, respectively.

* * * * *